United States Patent
Woolf et al.

(10) Patent No.: US 6,168,754 B1
(45) Date of Patent: Jan. 2, 2001

(54) METHOD AND APPARATUS FOR DENSIFYING POWDER METAL PREFORMS

(75) Inventors: Richard Mark Woolf, Cincinnati; Eric Riley, Troy, both of OH (US)

(73) Assignee: Federal-Mogul World Wide, Inc., Southfield, MI (US)

( * ) Notice: Under 35 U.S.C. 154(b), the term of this patent shall be extended for 0 days.

(21) Appl. No.: 09/251,163

(22) Filed: Feb. 17, 1999

(51) Int. Cl.[7] .................................. B22F 3/24
(52) U.S. Cl. ............... 419/28; 425/78; 72/343; 72/359; 29/893.34
(58) Field of Search .................. 72/343, 359; 29/893.34; 419/28; 425/78

(56) References Cited

U.S. PATENT DOCUMENTS

| | | |
|---|---|---|
| 2,542,912 | 2/1951 | Ensign . |
| 3,756,062 | * 9/1973 | Merola .................................. 72/352 |
| 3,842,646 | * 10/1974 | Kuhn ...................................... 72/354 |
| 3,851,512 | 12/1974 | Zhuravlev et al. . |
| 4,111,031 | 9/1978 | Vennemeyer et al. . |
| 4,693,864 | 9/1987 | Lloyd . |
| 4,712,411 | * 12/1987 | Goodwin ............................... 72/344 |
| 5,009,842 | 4/1991 | Hendrickson et al. . |
| 5,325,698 | 7/1994 | Nagpal et al. . |
| 5,368,629 | 11/1994 | Kondo et al. . |
| 5,390,414 | 2/1995 | Lisowsky . |
| 5,403,544 | 4/1995 | Adrian et al. . |
| 5,409,662 | 4/1995 | Hirai . |
| 5,453,242 | 9/1995 | Knoess . |
| 5,613,180 | 3/1997 | Kosco . |
| 5,659,955 | 8/1997 | Plamper . |

* cited by examiner

Primary Examiner—Ngoclan Mai
(74) Attorney, Agent, or Firm—Reising, Ethington, Barnes, Kisselle, Learman & McCulloch, P.C.

(57) ABSTRACT

A multi-stage forming tool for densifying the outer perimeter of post-sintered powder metal preforms includes a series of axially spaced die plates having different sized die openings arranged from largest to smallest. An oversized powder metal preform it is forced by a punch through the successive die openings causing the outer perimeter material to be displaced and densified. The space between successive dies allows for elastic recovery of the preform to maximize the compressive stress imparted to the preform at each die stage. A high density, high strength powder metal component results which is suitable as a replacement for wrought components in high strength applications such as transmission gears.

17 Claims, 3 Drawing Sheets

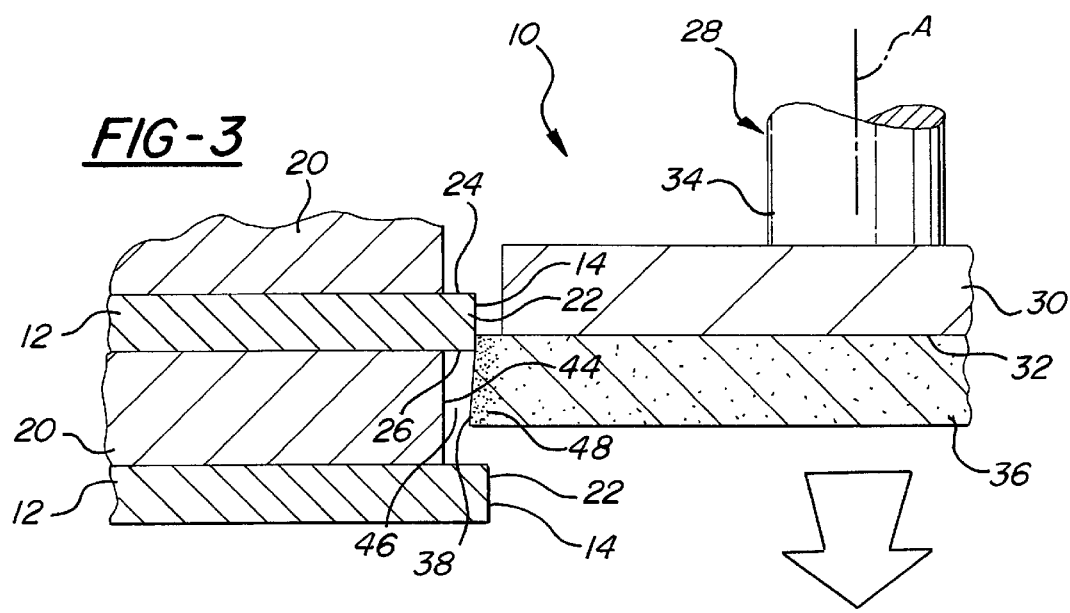
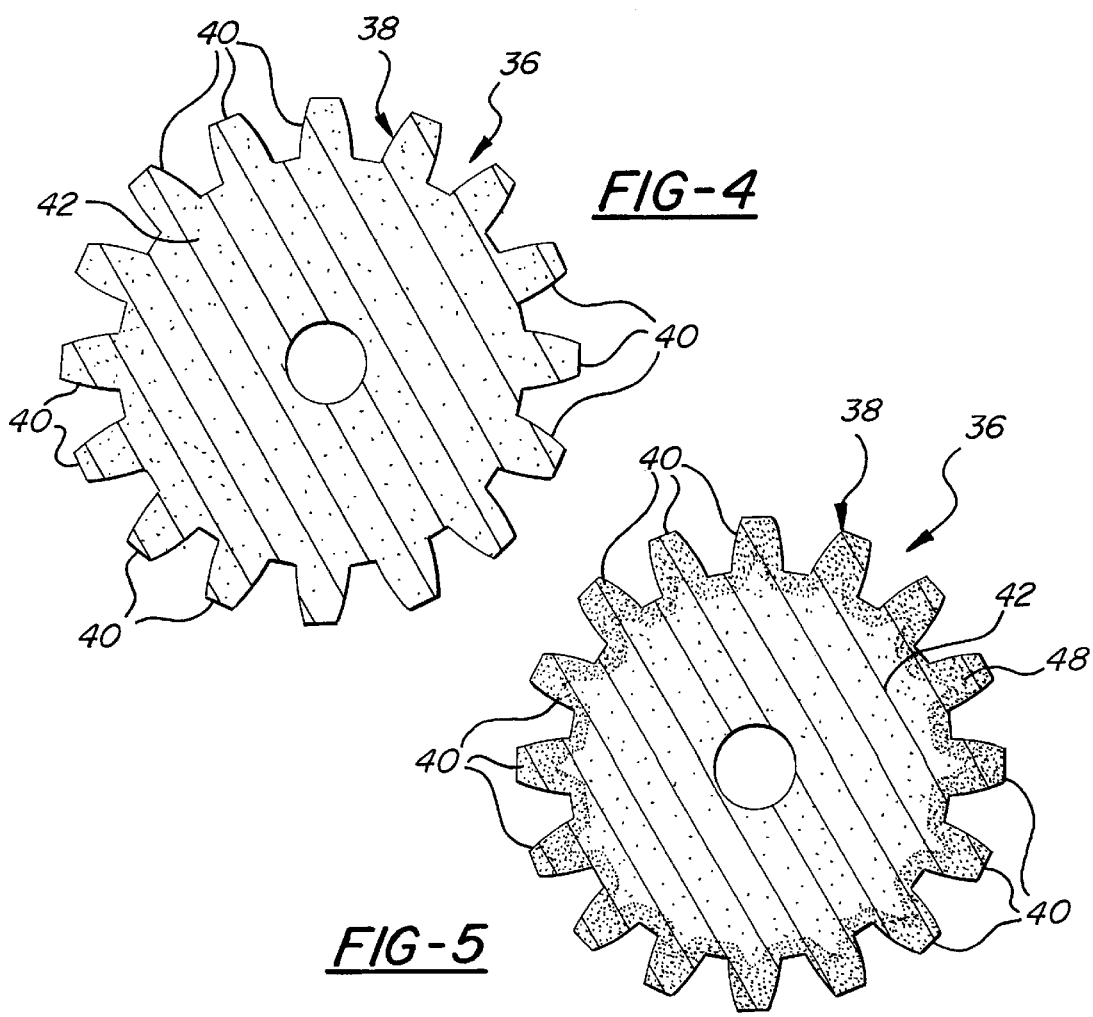

METHOD AND APPARATUS FOR DENSIFYING POWDER METAL PREFORMS

BACKGROUND OF THE INVENTION

1. Technical Field

This invention relates to post-sintering densification of powder metal preforms such as gears and the like.

2. Related Prior Art

Powder metal gears and other powder metal components have long offered a low cost alternative for many wrought components. Powder metal forming eliminates the high cost of machining association with wrought gears. However, applications where high strength components are required, such as transmission gears and the like, traditional powder metal components have not exhibited sufficient strength and dimensional tolerances necessary to serve as low cost alternatives to high strength wrought components.

A technique commonly used to densify sintered powder metal gear components is roll forming. The sintered gear preform is enmeshed with a rotating roll forming gear with sufficient force to displace and densify the surface of the preform teeth. U.S. Pat. No. 5,711,187 shows the general arrangement. An inherent disadvantage with such roll forming processes is that greater force is exerted on the driven side of the preform teeth than on the opposite coast side, leading to non-uniform densification and strength of the preform teeth. Some of the problem can be alleviated by reverse roll forming in the opposite direction, but the additional forming step adds cost and complexity to the manufacture of the gears and may not eliminate the problem entirely.

Powder metal gear preforms are also densified by impact forging the sintered preform in closed dies. See for example U.S. Pat. Nos. 2,542,912 and 5,009,842. The closed die process involves loading the preform into one end of the die and then forcing it past a forming ring which shapes the part. At the end of the stroke, the preform is compressed against an opposing punch or a bottom wall of the die to impart densification. The part is then ejected back through the same open end. The process does not lend to high production rate manufacturing of powder metal components.

It is an object of the present invention to advance the art of powder metal preform densification to provide high strength high precision powder metal components such as transmission gears that are comparable in strength and precision to corresponding wrought gears in a cost effective manner.

SUMMARY OF THE INVENTION AND ADVANTAGES

A method of producing powder metal articles is provided comprising compacting and sintering a powder metal preform having an outer perimeter portion thereof to be densified, providing a multi-stage forming tool according to the invention having a plurality of forming die plates disposed in axially spaced succession defining a series of progressively smaller sized die openings corresponding generally in shape to the portion of the preform to be densified, but being relatively and progressively smaller in size than that of the portion of the preform to be densified, and forcing the preform axially through the dies from largest to smallest and plastically and elastically deforming the preform portion in stepped progression through the die openings to achieve densification and sizing of the preform portion and imparting compressive stresses to the preform, with the spacing between adjacent dies being sufficient to allow elastic springback of the preform material between successive die plates.

The invention is advantageous in that it provides a cost effective means of forming high density, high precision powder metal components using a simple, but highly effective multi-stage forming tool and densificiation method. The outer peripheral surface of the forming portions contact the preform material at each stage and induce elastic and plastic deformation in the preform. The preform may be displaced in a quasi-static fashion, or with very high speed, ensuring an impact on the preform leading to rapid plastic deformation. The result of the deformation of the forming tool densifies the preform at and in the vicinity of the inner peripheral walls contacted by the forming tool This densification leads to a graduation of density and hence material properties. The density is greater at the peripheral walls and gradually decreases. Such a variation of material properties causes incomplete elastic recovery of the material, resulting in compressive residual stresses. At each successive stage, more deformation and less elastic recovery occurs resulting in an increase of compressive residual stresses. The spacing between successive die plates enables the preform to recover elastically in preparation for further deformation by the next die plate. Recovery of the elastic deformation between die plates is beneficial in maximizing the compressive stresses introduced to the preform at each stage to contribute to the strengthening of the preform.

BRIEF DESCRIPTION OF THE DRAWINGS

These and other features and advantages of the present invention will become more readily appreciated when considered in connection with the following detail description and appended drawings, wherein:

FIG. 3 is an enlarged fragmentary sectional view of a portion of the tool of FIG. 1 shown forming a preform;

FIGS. 4 and 5 are sectional views of a powder metal preform before and after processing, respectively, through the multi-stage forming tool of the invention;

DETAILED DESCRIPTION

Figure 1:
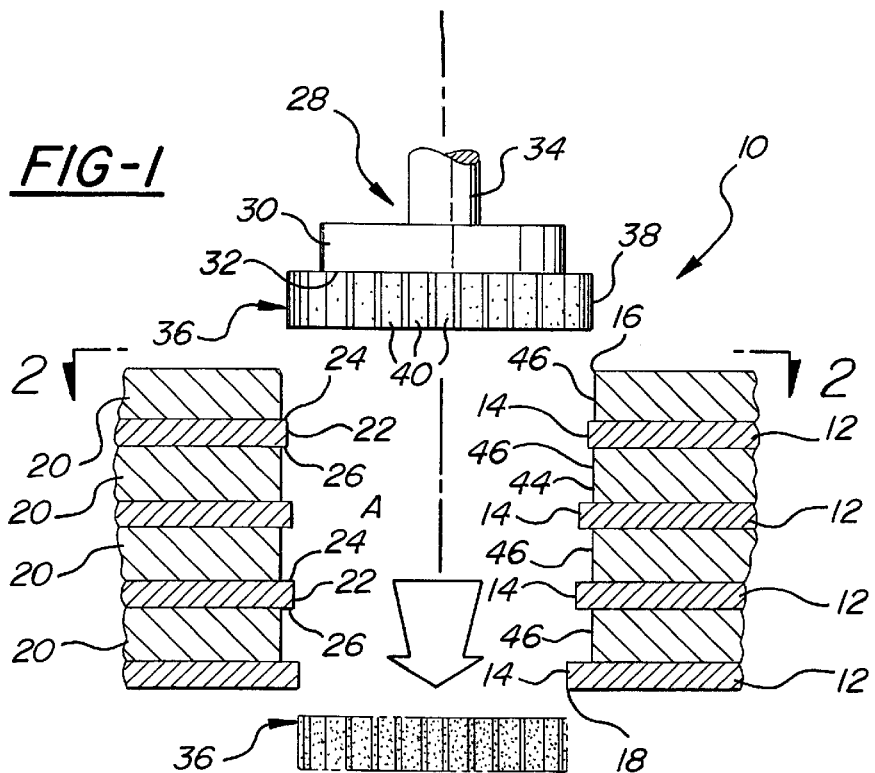
FIG. 1 is a schematic axial sectional view of a multi-stage forming tool constructed according to the invention.

A multi-stage forming tool for densifying powder metal preforms is indicated generally at 10 in FIG. 1 and comprises a plurality of discrete die plates 12 having die openings 14 formed having the same general shape but varying in size. The die plates 12 are arranged in axially spaced relation with the die openings 14 disposed concentrically about a common axis A and arranged in axial succession from the largest of the die openings at one axial end 16 of the tool to the smallest of the die openings at an opposite axial end 18. The die plates 12 are separated by spacer plates 20 that fix the dies plates 12 in their axially spaced relation.

The die plates 12 may be fabricated of tool steel or other suitable materials commonly employed for forming die applications. The die openings 14 are defined by inner peripheral walls 22 defining the shape and size of the openings 14. The wall 22 of each die plate 12 extends axially between opposite axial surfaces 24, 26 of each respective plate and is preferably parallel to the axis A to provide a straight-walled die opening. The transition from the leading axial surface 24 to the die opening wall 22 is preferably abrupt, and may have an angular or radial lead to prevent material removal. This abrupt change coupled with a high feed rate of the preform through the die openings imparts an impact force to a preform to induce compressive stresses. In the illustrated embodiment, the die openings 14 are formed in the inverse shape of a spur gear, with the smallest of the die plates 12 corresponding closely in size and shape to the desired finished size and shape of a powder metal gear to be formed by the multi-stage tool 10. It is to be understood that the invention is not limited to the formation of spur gears. Other gear tooth forms, such as helical gears, may be densified, and the die plates would be provided with the appropriate angular lead or helix and the preform rotated as it is fed axially through the die plates to accommodate the helical gear tooth form.

The tool 10 further includes a workpiece punch or ram 28 dimensioned and supported adjacent the upper axial end 16 of the tool for movement through the die openings 14 along the axis A toward the lower axial end 18 for advancing powder metal preforms through the tool 10 at a prescribed rate and force. The ram 28 includes a platen 30 having a lower workpiece engaging surface 32 sized for passage through the die openings 14. The platen 30 is mounted on a linear actuator 34 that operates to move the platen 30 axially through the die openings 14 and may be powered hydraulically, pneumatically, electrically, mechanically, or by other suitable means for advancing the platen 30 at the predetermined rate through the die openings 14 under predetermined loading conditions.

FIG. 4 illustrates an exemplary powder metal preform 36 to be densified by the multi-stage forming tool 10. The preform 36 is compacted and sintered to provide an outer perimeter 38 of a desired configuration which, in the illustrated embodiment, is in the general shape of a spur gear. The spur gear preform 36 comprises a series of uniform gear teeth 40 extending radially from a preform body 42. Following compacting and sintering, the teeth 40 and body 42 have about the same density. The objective of processing the preform 36 through the multi-stage forming tool is to density the outer perimeter 38 of the preform 36 and thereby harden the gear teeth 40. In addition to densification, the tool 10 imparts beneficial compressive stresses to the outer perimeter which further hardens the gear teeth 40.

In operation, and referring initially to FIG. 1, the preform 36 is positioned above the uppermost die plate 12 adjacent the upper axial open end 16 of the forming tool 10. The ram 28 is actuated to rapidly advance the preform 36 through the series of die openings 14 whereupon the preform 36 exits the lower axial open end 18 of the tool with it outer perimeter 38 having been densified as a result of passage through the die plates 12.

The outer perimeter 38 of the preform 36 is initially slightly oversized in relation to the die openings 14 such that in order to pass through the die plates 12, the outer perimeter 38 must be reduced radially in size. The reduction is achieved through densification of the outer perimeter 38. As illustrated in FIG. 3, as the preform 36 is forced through a die plate 12, the wall 22 of the die opening 14 acts to displace the preform material at the outer perimeter 38 radially inwardly imparting densification to the outer perimeter 38. The spacer plates 20 have central openings 44 aligned coaxially with the die openings 14 and being of the same general shape but relatively greater in size than that of the die openings 14 to provide an annular gap 46 between adjacent die plates 12 of such size as to prevent the spacer plates 20 from contacting the preform 36 during its progression through the die plates 12.

Referring still to FIG. 3, as the preform 36 passes through each of the die openings 14, it is deformed both plastically and elastically and the impact with each die plate 12 imparts beneficial compressive stresses to the preform 36. As the preform 36 passes through each die plate 12 and into the gap 46 separating each die plate 12 from the subsequent die plate 12, the preform 36 is permitted to expand radially outwardly to recover at least some and preferably substantially all of the elastic component of the deformation before encountering the next successive die plate 12. The outer peripheral surface of the forming portions 22 contact the preform material at each stage and induce elastic and plastic deformation in the preform. The preform may be displaced in a quasi-static fashion, or with very high speed, ensuring an impact on the preform leading to rapid plastic deformation. The result of the deformation of the forming tool densifies the preform at and in the vicinity of the inner peripheral walls contacted by the forming tool. This densification leads to a graduation of density and hence material properties. The density is greater at the peripheral walls and gradually decreases. Such a variation of material properties causes incomplete elastic recovery of the material, resulting in compressive residual stresses. At each successive stage, more deformation and less elastic recovery occurs resulting in an increase of compressive residual stresses.

FIG. 5 illustrates the preform 36 following processing through the multi-stage tool 10. It can be seen from a comparison with FIG. 4 that the outer perimeter 38 is slightly reduced. The zone of densification is indicated at 48 as a stippled region. The zone 48 further has beneficial compressive stresses imparted thereto as a result of reduction through the forming tool 10 which, together with the densification, hardens the gear teeth 40 to provide a high strength gear having sufficient strength to be suitable in high strength gear applications such as transmission gear components in lieu of wrought gears. A further benefit of the multi-stage forming tool 10 is that is finishes the outer perimeter 38 of the preform 36 to within close tolerances comparable with that achievable by wrought gears.

The spacing of the die plates 12 and the relative changes in size between successive stages to achieve the desired degree of densification, compressive stress and dimensional tolerance is dependent on a number of variables, including the feed rate of the preform 36 through the die plates 12, the powder metal material and starting density of the preform 36, the axial thickness of the preform 36, configuration of the preform, etc. In the illustrated embodiment, the spacing between adjacent die plates 12 is equal to or greater than the axial thickness of the preform 36, although more or less spacing is contemplated. The die openings 14 may decrease in size, for example, at 0.002 inch intervals at each die stage.

Figure 2:
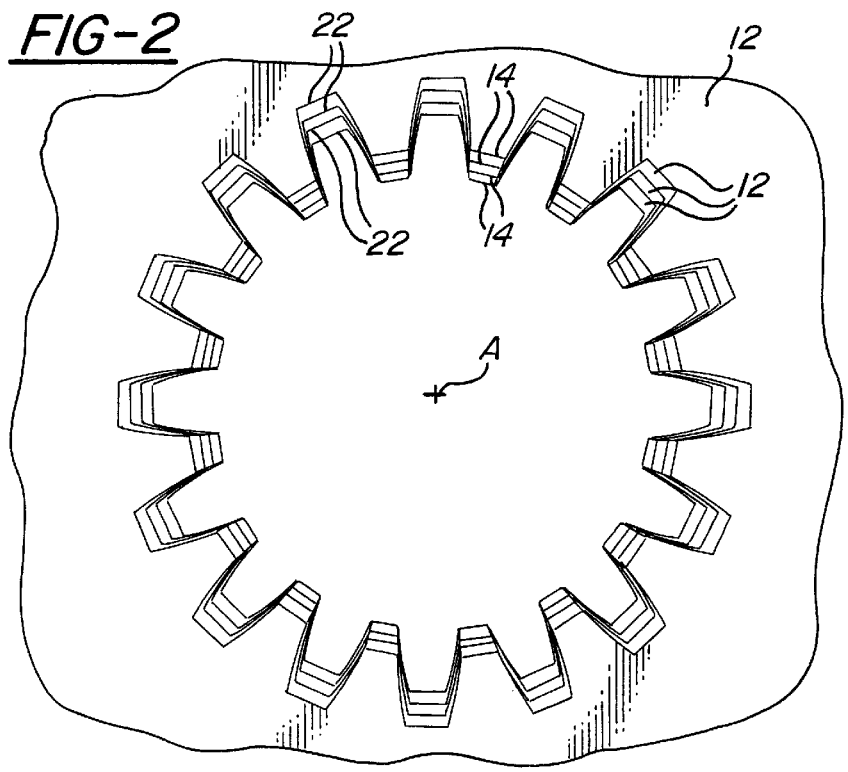
FIG. 2 is an enlarged cross-sectional view taken generally along 2—2 of FIG. 1.
Figure 6:
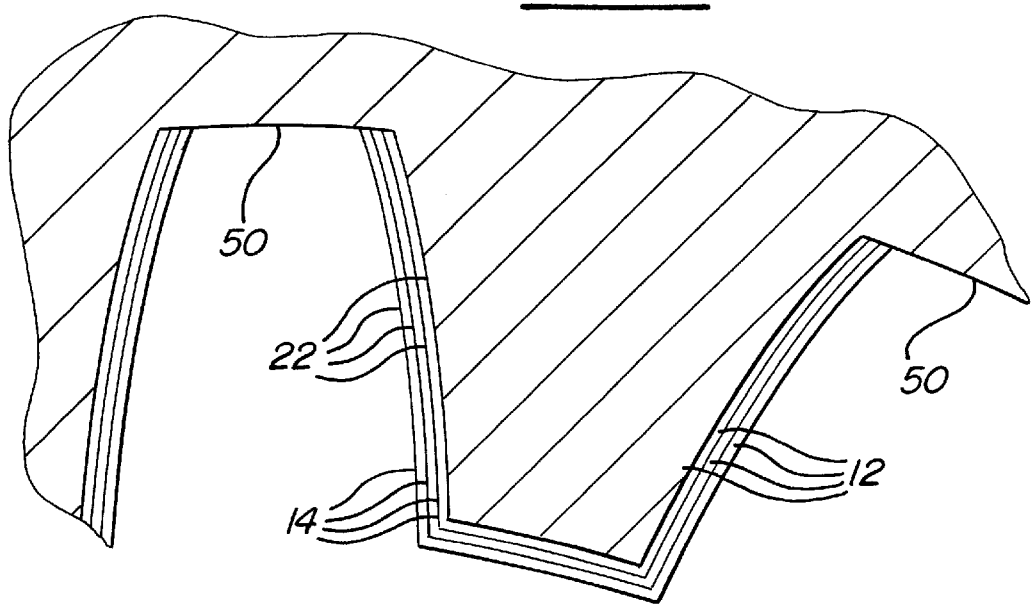
FIG. 6 is an enlarged fragmentary sectional view of an alternative forming tool construction.
Figure 7:
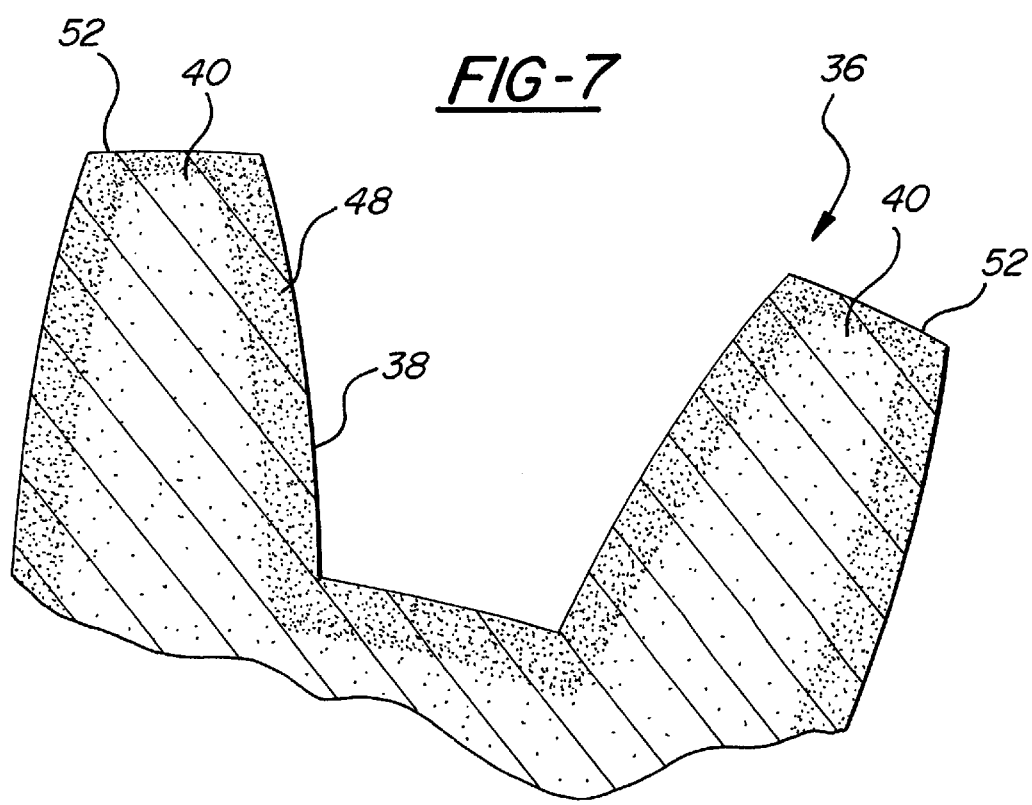
FIG. 7 is an enlarged fragmentary sectional view of a powder metal preform formed by the tool of FIG. 6.

As best illustrated in FIG. 2, the successively smaller die plates are shown as being reduced uniformally in the radial direction at each stage such that uniform radial densification of the outer perimeter 38 results, as shown in FIG. 5. It will be appreciated, however, that the invention contemplates other than uniform changes in successive die openings 14 so as to enable selective densification of some regions of the outer perimeter 38 more or less than others. Such an arrangement is shown in the alternative embodiment of FIGS. 6 and 7, wherein the same reference numerals are used to represent like features, but are offset by 100. The die openings 114 of the die plates 112 of FIG. 6 are successively smaller in size, however it will be seen that the regions 50 corresponding to the tips 52 of the preform teeth 140 do not change from one die plate 112 to the next, but the regions 54 corresponding to the working faces 56 of the teeth 140 do change. FIG. 7 illustrates the variation in densification that occurs as a result of the non-uniform change of the die plate openings 114. The opposite worldling faces 56 of the teeth 140 are densified as a result of multiple deformation operations performed on these regions as the preform 112 passes through the relatively smaller size die openings 114. The tips 52 of the teeth 140 are densified to a lesser extent, as indicated by the narrower stippled region, having undergone less reduction through the die plates 112.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method producing powder metal articles comprising:

compacting and sintering a powder metal preform having an outer perimeter portion thereof of predetermined shape to be densified;

providing a multi-stage forming tool having a plurality of axially spaced forming die plates with die openings of the same general shape as that of the outer perimeter portion of the preform but being progressively smaller in size; and forcing the preform through the die openings from largest to smallest and plastically and elastically deforming the outer perimeter portion in stepped progression through the die openings to size and densify the outer perimeter portion and impart compressive stresses to the preform with the spacing between the die plates allowing elastic springback of the preform material between successive die plates.

2. The method of claim 1 wherein the outer perimeter of the compacted and sintered preform is formed to be initially oversized in relation to the size die openings.

3. The method of claim 1 wherein the preform is compacted and sintered into the general shape of a gear having a series of outer peripheral gear teeth of predetermined size and the die openings are provided in the general shape of inverse gear teeth relatively smaller in size than that of the preform gear teeth so as to repeatedly deform and densify the preform teeth at the multiple die plate stages.

4. The method of claim 1 wherein the preform is fabricated with a fixed axial length and spacing the die plates at a distance corresponding generally to the thickness of the preform.

5. The method of claim 1 including reducing and densifying the entire outer perimeter of the preform upon passage through the die openings.

6. The method of claim 1 wherein the forming tool has opposite axial ends that are open and the preform is introduced into the tool at one axial end and is ejected from the opposite axial end.

7. The method of claim 1 including disposing spacers between the successive die plates to support the die plates in their axially spaced relation.

8. The method of claim 7 including spacing the spacers radially outwardly of the die openings to provide an annular expansion gap between successive die plates to accommodate the elastic springback of the preform.

9. The method of claim 8 including forcibly impacting the preform against an exposed face of each die plate.

10. The method of claim 1 wherein the preform is forced through the successive die openings by moving the preform and dies relative to one another axially of the die openings.

11. A multi-stage forming tool for densifying compacted and sintered powder metal preforms having an outer peripheral portion of predetermined initial shape and size to be densified, said tool comprising:

a plurality of die plates mounted in axial succession and being axially spaced from one another by a predetermined distance; and a corresponding plurality of die openings formed in said die plates having the same general shape as that of the outer peripheral portion of the preform to be densified but varying in size and arranged in axial succession from largest to smallest with each success die opening being smaller than the previous die opening by a predetermined amount.

12. The tool of claim 11 including spacer plates disposed between said die plates defining radially enlarged annular gaps between said die plates to enable at least partial recovery of an elastic component of deformation imparted to the preform as it passes through each of said die openings.

13. The tool of claim 11 wherein said tool has axially opposite open ends defining an inlet for the preform at one of said ends associated with said largest of said die openings and an outlet for the preform at the opposite said end associated with said smallest of said die openings.

14. The tool of claim 11 wherein said die openings have the general inverse shape of gear teeth.

15. The tool of claim 11 wherein said die openings decrease uniformly in succession.

16. The tool of claim 11 where at least one region of said die openings decrease in size to a greater extent than other regions.

17. A multi-stage forming tool for densifying and imparting compressive stresses to compacted and sintered powder metal gear preforms, comprising: a plurality of die plates arranged in axial succession having die openings formed in the general inverse shape of gear teeth and varying in size from largest to smallest; and spaces disposed between said die plates supporting said die plates in axially spaced relation to one another and defining axially enlarged expansion gaps between said die plates to accommodate at least partial recovery of an elastic component of deformation imparted to the preform as it passes through each of said die openings.

* * * * *

UNITED STATES PATENT AND TRADEMARK OFFICE
CERTIFICATE OF CORRECTION

PATENT NO. : 6,168,754 B1
DATED : January 2, 2001
INVENTOR(S) : Richard M. Woolf et al.

Page 1 of 1

It is certified that error appears in the above-identified patent and that said Letters Patent is hereby corrected as shown below:

<u>Column 5,</u>
Line 7, change "worldling" to -- working --.

<u>Column 6,</u>
Line 24, change "success" to -- successive --.

Signed and Sealed this

Twenty-fifth Day of September, 2001

Attest:

*Attesting Officer*

NICHOLAS P. GODICI
*Acting Director of the United States Patent and Trademark Office*